United States Patent
Gao et al.

(10) Patent No.: US 10,991,372 B2
(45) Date of Patent: Apr. 27, 2021

(54) METHOD AND APPARATUS FOR ACTIVATING DEVICE IN RESPONSE TO DETECTING CHANGE IN USER HEAD FEATURE, AND COMPUTER READABLE STORAGE MEDIUM

(71) Applicant: BEIJING BAIDU NETCOM SCIENCE AND TECHNOLOGY CO., LTD., Beijing (CN)

(72) Inventors: Liang Gao, Beijing (CN); Jiliang Xie, Beijing (CN)

(73) Assignee: BEIJING BAIDU NETCOM SCIENC AND TECHNOLOGY CO., LTD., Beijing (CN)

( * ) Notice: Subject to any disclaimer, the term of this patent is extended or adjusted under 35 U.S.C. 154(b) by 141 days.

(21) Appl. No.: 16/222,147

(22) Filed: Dec. 17, 2018

(65) Prior Publication Data

US 2019/0228773 A1 Jul. 25, 2019

(30) Foreign Application Priority Data

Jan. 23, 2018 (CN) .......................... 201810063682.9

(51) Int. Cl.
*G10L 15/25* (2013.01)
*G10L 15/22* (2006.01)
(Continued)

(52) U.S. Cl.
CPC ............ *G10L 15/25* (2013.01); *G06F 1/3231* (2013.01); *G06F 3/012* (2013.01); *G06F 3/013* (2013.01);
(Continued)

(58) Field of Classification Search
CPC ....... G10L 15/22; G10L 15/265; G06F 3/167; H04M 2201/40
(Continued)

(56) References Cited

U.S. PATENT DOCUMENTS 7,518,631 B2 * 4/2009 Hershey .................. G10L 15/26
348/14.1
8,355,913 B2 * 1/2013 Kiss ........................ G10L 15/26
704/235
(Continued)

FOREIGN PATENT DOCUMENTS

| CN | 102622085 A | 8/2012 |
|---|---|---|
| CN | 103135762 A | 6/2013 |

(Continued)

OTHER PUBLICATIONS

Lip Motion Capture and Its Application to 3-D Molding, Masashi Okubo, Tornio Watanabe, International Conference on Automatic Face & Gesture Recognition, Nara, Japan, Apr. 1998. (Year: 1998).*

(Continued)

*Primary Examiner* — Jesse S Pullias
(74) *Attorney, Agent, or Firm* — Lathrop GPM LLP

(57) ABSTRACT

Embodiments of the present disclosure are directed to a speech interaction method executed at an electronic device, a speech interaction apparatus, and a computer readable storage medium. The method includes receiving an image sequence of a user from an image capturing apparatus coupled to the electronic device. The method also includes detecting a change in a head feature of the user from the image sequence. After that, the method includes determining whether the change in the head feature matches a predetermined change pattern. The method further includes causing the electronic device to enter an active state in response to determining that the change in the head feature matches the predetermined change pattern, the electronic device in the active state being capable of responding to a speech command of the user.

17 Claims, 5 Drawing Sheets

(51) Int. Cl.
*G06F 3/01* (2006.01)
*G06F 3/03* (2006.01)
*G06F 3/16* (2006.01)
*G06F 1/3231* (2019.01)

(52) U.S. Cl.
CPC .............. *G06F 3/0304* (2013.01); *G06F 3/16* (2013.01); *G10L 15/22* (2013.01)

(58) Field of Classification Search
USPC .................................. 704/231–257, 270–275
See application file for complete search history.

(56) References Cited

U.S. PATENT DOCUMENTS

| | | | | |
|---|---|---|---|---|
| 8,467,672 | B2* | 6/2013 | Konicek | H04N 5/232 396/56 |
| 9,263,044 | B1* | 2/2016 | Cassidy | G06K 9/6201 |
| 9,526,127 | B1* | 12/2016 | Taubman | H04W 88/02 |
| 10,269,351 | B2* | 4/2019 | Aggarwal | G10L 15/222 |
| 2002/0105575 | A1* | 8/2002 | Hinde | G10L 15/24 348/14.01 |
| 2008/0252745 | A1* | 10/2008 | Nakamura | H04N 5/232 348/222.1 |
| 2013/0021459 | A1 | 1/2013 | Vasilieff et al. | |
| 2013/0030811 | A1 | 1/2013 | Olleon et al. | |
| 2014/0343944 | A1 | 11/2014 | Benhaim et al. | |

FOREIGN PATENT DOCUMENTS

| | | |
|---|---|---|
| CN | 103701981 A | 4/2014 |
| CN | 103853440 A | 6/2014 |
| CN | 105204628 A | 12/2015 |
| CN | 105589555 A | 5/2016 |
| CN | 105874405 A | 8/2016 |
| CN | 105913039 A | 8/2016 |
| CN | 106537490 A | 3/2017 |
| CN | 107204194 A | 9/2017 |
| EP | 1215658 A2 | 6/2002 |
| JP | 2011062465 A | 3/2011 |
| WO | WO 2017035768 A1 | 3/2017 |

OTHER PUBLICATIONS

Lip Motion Automatic Detection, Franck Luthon, & M. Livin, 10th Scandinavian Conference on Image Analysis, Lappeenratra, Finland, Jun. 1997. (Year: 1997).*
Chinese Patent Application No. 201810063682.9 Office Action dated Jun. 3, 2020, 9 pages.
Chinese Patent Application No. 201810063682.9 English translation of Office Action dated Jun. 3, 2020, 7 pages.

* cited by examiner

METHOD AND APPARATUS FOR ACTIVATING DEVICE IN RESPONSE TO DETECTING CHANGE IN USER HEAD FEATURE, AND COMPUTER READABLE STORAGE MEDIUM

CROSS-REFERENCE TO RELATED APPLICATION

The present application is based upon and claims priority to Chinese Patent Application No. 201810063682.9, filed on Jan. 23, 2018, the entire contents of which are incorporated herein by reference.

FIELD

The present disclosure relates to an intelligent interaction field, and more particularly, to a speech interaction method and apparatus, and a computer readable storage medium.

BACKGROUND

An intelligent interaction system, especially a speech interaction system, is now more commonly used in people's daily lives, works, and even production processes. For example, as an important application in the speech interaction system, a speaker with a speech (voice) interaction function greatly facilitates people's lives due to its wide application. When the speaker with the speech interaction function is arranged in the home, the user may wake up the speaker to an active state by simply giving a specific speech command to the speaker, and the speech interaction may be performed between the user and the speaker. The process of the speech interaction is usually done within a certain period of time.

After a series of speech interactions are completed, the speaker with the speech interaction function will enter a sleeping state (an inactive state). If the user needs to interact with the speaker again, the user is required to give a specific speech command to the speaker for another time. Repeating the above-mentioned specific speech commands for several times may greatly reduce the user experience, and the speakers only configured with the speech wake-up and interaction functions are not available to a specific group of people.

SUMMARY

According to embodiments of the present disclosure, a speech interaction solution executed at an electronic device is provided.

Embodiments of the present disclosure provide a speech interaction method executed at an electronic device. The method may include: receiving an image sequence of a user from an image capturing apparatus coupled to the electronic device. The method also includes detecting a change in a head feature of the user from the image sequence. After that, the method may include determining whether the change in the head feature matches a predetermined change pattern. The method further includes causing the electronic device to enter an active state in response to determining that the change in the head feature matches the predetermined change pattern, the electronic device in the active state being capable of responding to a speech command of the user.

Embodiments of the present disclosure provide an apparatus implemented at an electronic device. The apparatus may include an image sequence receiving module. The image sequence receiving module is configured to receive an image sequence of a user from an image capturing apparatus coupled to the electronic device. The apparatus may also include a change detecting module. The change detecting module is configured to detect a change in a head feature of the user from the image sequence. The apparatus may also include a matching determining module. The matching determining module is configured to determine whether the change in the head feature matches a predetermined change pattern. The apparatus may also include an activating module. The activating module is configured to cause the electronic device to enter an active state in response to determining that the change in the head feature matches the predetermined change pattern, the electronic device in the active state being capable of responding to a speech command of the user.

Embodiments of the present disclosure provide a computer readable storage medium having a computer program stored thereon, the computer program being executed by a processor to implement the method according to the first aspect of the present disclosure.

It should be appreciated that, contents described in the summary are not aimed at limiting key or important features of embodiments of the present disclosure, neither at limiting the scope of the present disclosure. Other features of the present disclosure will become apparent from the following descriptions.

BRIEF DESCRIPTION OF THE DRAWINGS

The above and other features, advantages and aspects of various embodiments of the present disclosure will become more apparent with reference to the figures and following detail descriptions. In the drawings, the same or similar reference numerals indicate the same or similar elements, in which.

DETAILED DESCRIPTION

Figure 1:
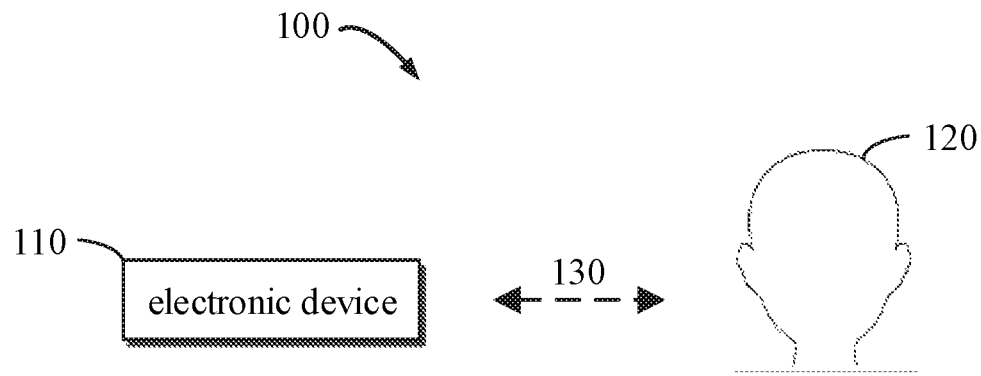
FIG. 1 illustrates a schematic diagram of an example environment in which embodiments of the present disclosure are capable to be implemented.

Embodiments of the present disclosure will be described in more detail below with reference to the accompanying drawings. Although certain embodiments of the present disclosure are illustrated in the drawings, it should be understood that the present disclosure may be implemented in various forms and should not be construed as limited to the embodiments set forth herein. Instead, providing these embodiments is to fully and completely understand the present disclosure. It should be understood that, the drawings and embodiments of the present disclosure are merely illustrative and should not be considered as limiting the scope of the disclosure.

In the description of the embodiments of the present disclosure, the term "comprise" and its equivalents are to be understood as an open "include" (a non-exclusive "include"), i.e., "include but is not limited to. The term "based on" should be understood as "based at least in part (at least partially based on)". The term "one embodiment" or "an embodiment" should be taken to mean "at least one embodiment". The terms "first", "second" and the like may refer to different or identical objects. Other explicit and implicit definitions may also be included in the following.

As mentioned above, in order to wake up the intelligent interaction device to an active state, in a conventional solution, it is usually implemented based on a speech (voice) command from the user. Such solution has drawbacks in terms of user experience and universality. For example, since a wake-up operation needs to be completed via the speech command each time an intelligent interaction is required, repeatedly giving a specific speech command may greatly reduce the user experience. In addition, since it is necessary to complete the wake-up operation via a speech command, for users such as deaf-mutes, and for a work environment requiring a silent background, the intelligent devices only provided with the speech wake-up and interactive functions have limitations.

In response to the above problems and potentially other related problems, embodiments of the present disclosure propose a technical solution to be executed at an electronic device. In this solution, instead of performing a wake-up operation on the electronic device via the user's speech command as in the prior art, the image sequence about the user may be received from an image capturing apparatus coupled to the electronic device, and it is determined whether to wake up the electronic device to enter an active state according to whether a change in a head feature matches a predetermined change pattern in the image sequence. The user may detect motions of the corresponding head feature in a sensing range the electronic device to cause the electronic device enter the active state. By waking up or activating the electronic device in the above manner, the user experience may be effectively improved, and the applicable population of the intelligent interaction system may be expanded.

As used herein, the term "head feature" refers to an image related to a head of the user sensed by an image capturing apparatus coupled to an electronic device. For example, the head feature may include, but are not limited to, a user's head profile, a face (a combination of multiple organs in the facial senses), an eye, a mouth, or an ear sensed by the image capturing apparatus and the like. In other words, the user may cause the electronic device entering the active state by actions including head swinging, eye blinking, mouth opening and the like or a combination of the similar actions. Alternatively or additionally, the head feature may also include a facial expression of the user.

In embodiments of the present disclosure, since the electronic device such as an intelligent interaction system determines whether a change in the user's head feature matches a predetermined change pattern by identifying the change in the user's head feature. Therefore, the electronic device may not only be applied to a speech interaction speaker for a current use, but also to other intelligent interaction systems, such as the Internet of Things intelligent interaction system.

Embodiments of the present disclosure will be described in detail below with reference to the drawings.

FIG. 1 illustrates a schematic diagram of an example environment 100 in which various embodiments of the present disclosure may be implemented. The example environment 100 includes an electronic device 110. The electronic device 110 may be a speech interaction system such as a voice speaker. The example environment 100 also includes a user 120. The user 120 interacts with the electronic device 110 via an interactive link 130. Compared to the conventional technical solution of waking up the electronic device by a user's speech command, the wake-up operations to the electronic device 110 by the user 120 are implemented by the electronic device 110 identifying the image information of the user 120.

Figure 2:
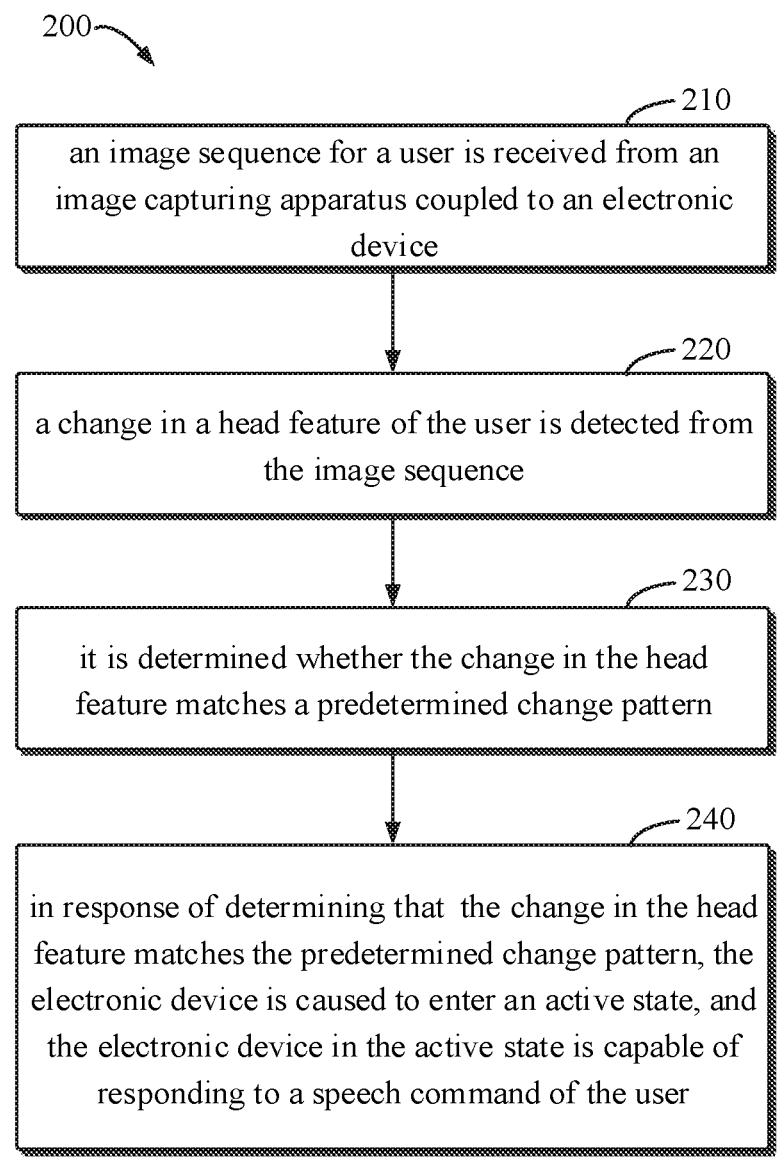
FIG. 2 illustrates a flowchart of a process executed at an electronic device according to an embodiment of the present disclosure.

The process performed at the electronic device 110 will be described in detail below with reference to FIG. 2. FIG. 2 illustrates a flowchart of a process or method 200 performed at electronic device 110 according to an embodiment of the present disclosure. In some embodiments, the method 200 may be implemented in the device shown in FIG. 10 below.

Figure 3A:
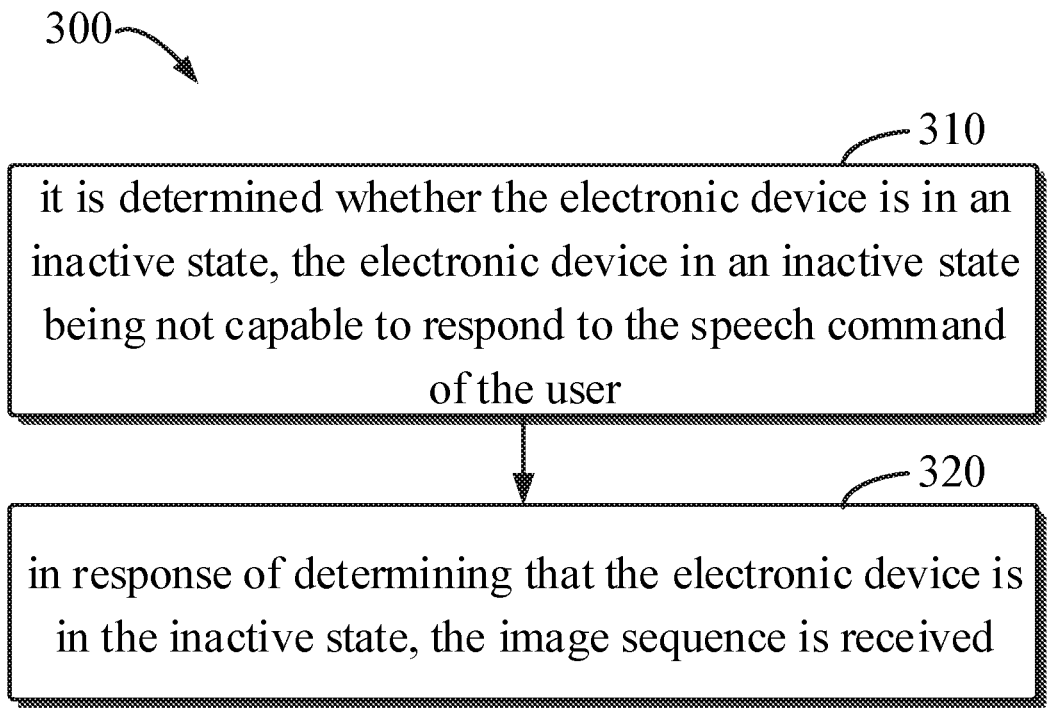
FIG. 3A illustrates a flowchart of a process of receiving an image sequence according to some embodiments of the present disclosure.

At block 210, an image sequence of the user 120 is received from an image capturing apparatus (not shown) coupled to the electronic device 110. In some embodiments, the image capturing apparatus is operatively coupled to the electronic device 110 to transmit the captured image sequence of the one or more users 120 to the electronic device 110. Alternatively or additionally, a plurality of image capturing apparatuses wirelessly coupled to the electronic device 110 may be disposed within the living or working area of the user 120 to enable sensing of image sequence of the user 120 located within the living or work area anytime and anywhere. As an example, FIG. 3A illustrates a flowchart of a process 300 of receiving an image sequence according to some embodiments of the present disclosure. In some embodiments, process 300 may be implemented in the apparatus shown in FIG. 10 below. At block 310, it is determined whether the electronic device 110 is in an inactive state. Here, the electronic device 110 in an inactive state is not capable to respond to the speech command of the user 120. Further, at block 320, the image sequence is received when it is determined that the electronic device 110 is in the inactive state. As an example, when it is determined that the electronic device 110 is in the inactive state, only image capturing apparatuses operatively coupled to the electronic device 110 may be turned on to perform a real-time sensing of images related to the user 120. Additionally or alternatively, when it is determined that the electronic device 110 is in the inactive state, the image capturing apparatus operatively coupled to the electronic device 110 may be turned on or off in a particular time order according to the needs of the user 120. As an example, the user 120 may set the electronic device 110 to be fully turned off (including the image capturing apparatus) for a particular period of time, such as sleep time. By acquiring the image sequence with respect to the user 120, image identification may be made instead of speech identification to be the primary basis for waking up the electronic device 110.

Figure 3B:
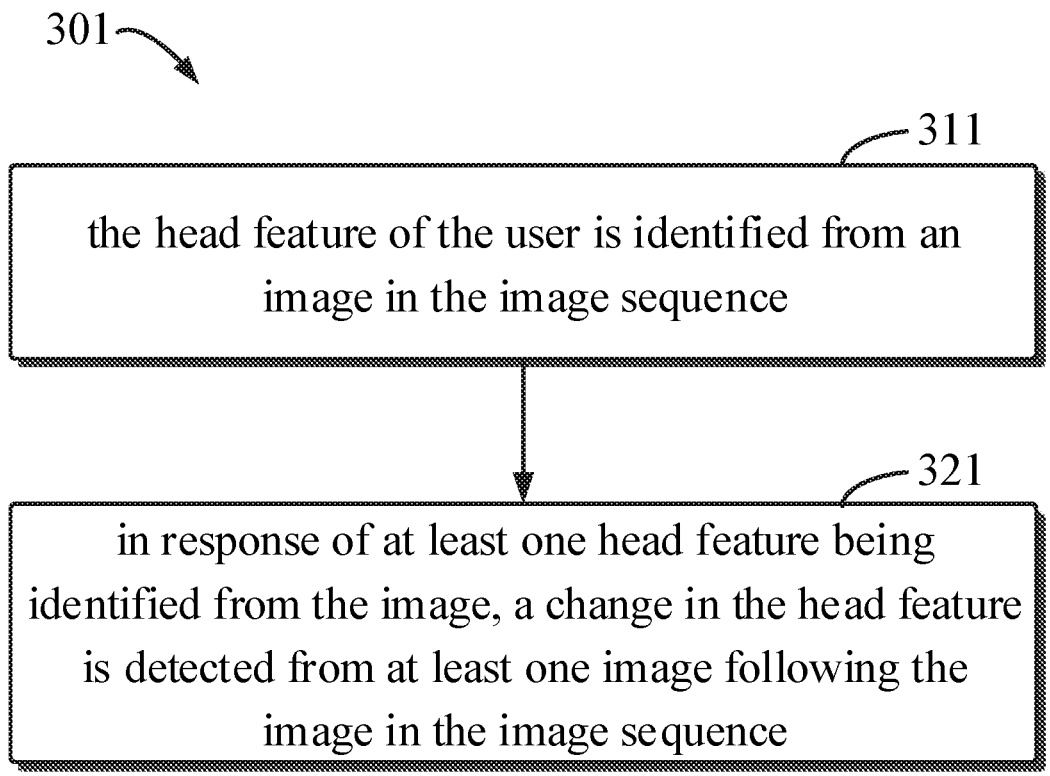
FIG. 3B illustrates a flowchart of a process of detecting a change in a head feature according to some embodiments of the present disclosure.

Referring to FIG. 2 again, at block 220, a change in a head feature of the user 120 is detected from the image sequence. In some embodiments, when an image related to the user 120 is detected, it may be detected whether there exists the head feature according to a predetermined algorithm. FIG. 3B illustrates a flowchart of a process 301 of detecting a change in a head feature according to some embodiments of the present disclosure. In some embodiments, process 301 may be implemented in the device shown in FIG. 10 below. As an example, at block 311, the head feature of the user 120 is identified from an image in the image sequence. Alternatively or additionally, images in a plurality of image sequences are detected at a predetermined time interval, and when a portion of the data associated with the user 120 is detected in one of the images, the head feature of the user 120 are further identified. At block 321, when at least one head feature is identified from the image, a change in the head feature is detected from at least one image following the image in the image sequence. As an example, when the head feature of the user 120 is detected from one image in the plurality of image sequences, the detection of the head feature in the subsequent images is continued, and the head features of two images having a predetermined time interval are compared so as to detect whether the head feature is changed.

Referring to FIG. 2 again, at block 230, it is determined whether the change in the head feature matches a predetermined change pattern. In some embodiments, the predetermined change pattern may be a swing or blink action. In other words, when the user 120 is sensed to perform a swing or blink action, the electronic device 110 is caused to enter an active state.

Alternatively or additionally, when the user 120 is sensed to perform a smile action, the electronic device 110 is caused to enter the active state. The above embodiments will be described in detail below when describing FIGS. 4 to 8. In contrast to conventional speech identification (i.e., determining whether the user's speech command matches a predetermined speech), the present disclosure adapts a technical solution in which the user 120 wakes the electronic device 110 up by a particular head action.

At block 240, when it is determined that the change in the head feature matches the predetermined change pattern, the electronic device 110 is caused to enter an active state, and the electronic device 110 in the active state is capable of responding to a speech command of the user 120. In some embodiments, when the electronic device 110 is a speaker providing a speech interaction function, the speaker may respond to the speech command of the user 120, such as playing a particular song, in the active state. Alternatively or additionally, when the electronic device 110 is an intelligent guiding device providing an information retrieval function, the intelligent guiding device may respond to the speech command of the user 120, such as a hospital-specific clinic, in the active state.

In some embodiments, the method 200 may further include (but not shown): causing the electronic device 110 to enter an inactive state in response to the electronic device being in the active state and not receiving the speech command from the user within a first threshold time interval, the electronic device 110 in the inactive state being incapable of responding to the speech command of the user 120.

With the method 200 described above, the user 120 may activate the electronic device 110 by a simple head motion. In this way, a reduction in user experience due to repeatedly giving a specific speech command may be avoided. In addition, since the head motion for activating the electronic device 110 does not require to generate sounds, it is highly applicable to users such as deaf-mutes and to work environments that require a silent background.

For ease of understanding, embodiments of determining whether the change in the head feature matches a predetermined change pattern will now be described with reference to FIGS. 4-8. It should be noted that the detection and matching of the head feature shown in FIGS. 4-8 are exemplary. Other modifications and variations within the scope of the present disclosure are also applicable to the implementations described in the present disclosure.

Figure 4:
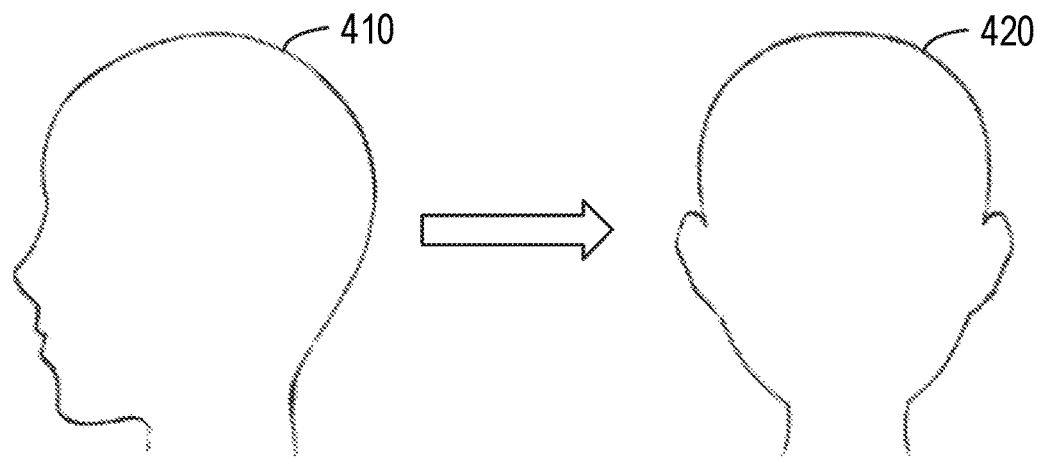
FIG. 4 illustrates a schematic diagram of a change of a head profile when determining whether a change in a head feature matches a predetermined change pattern according to some embodiments of the present disclosure.

FIG. 4 illustrates a schematic diagram of a change of a head profile when determining whether a change in a head feature matches a predetermined change pattern according to some embodiments of the present disclosure. As shown in FIG. 4, the predetermined change pattern may be that the head profile is changed from a side profile 410 to a front profile 420. That is, when it is determined that the head profile of the user 120 is changed from the side profile 410 to the front profile 420, it is determined that the change in the head feature matches the predetermined change pattern. In this way, it is possible to more easily sense a start action (i.e., a wake-up action) of the user 120 turning the face to the electronic device 110 so as to perform the interaction.

Figure 5:
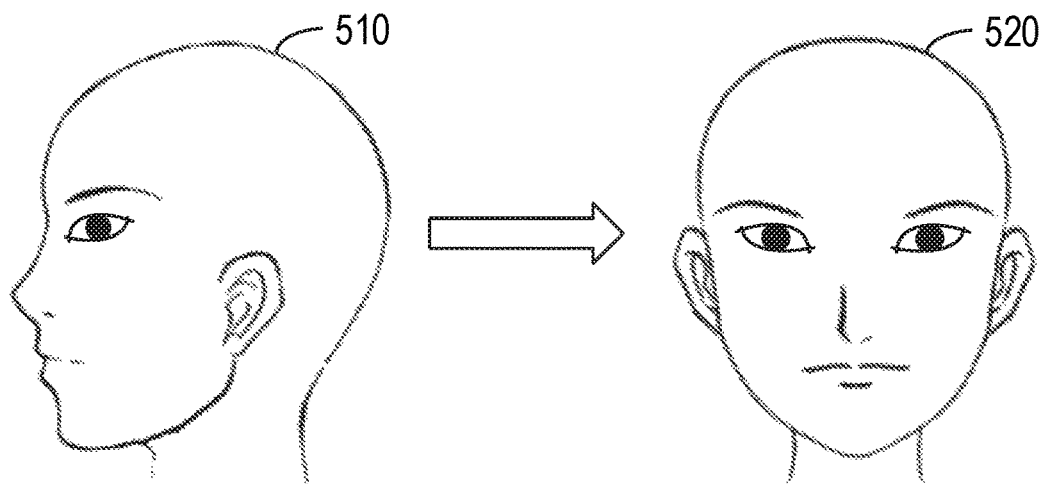
FIG. 5 illustrates a schematic diagram of a change of a face position when determining whether a change in a head feature matches a predetermined change pattern according to some embodiments of the present disclosure.

FIG. 5 illustrates a schematic diagram of a change of a face position when determining whether a change in a head feature matches a predetermined change pattern according to some embodiments of the present disclosure. As shown in FIG. 5, the predetermined change pattern may be that a face of the user 120 moves from a first position 510 to a second position 520. The first position 510 is a position of the face not facing towards the image capturing apparatus 110, and the second position 520 a position of the face at least partially facing towards the image capturing apparatus. That is, when it is determined that the face of the user 120 moves from the first position 510 to the second position 520, it is determined that the change in the head feature matches the predetermined change pattern. Alternatively or additionally, facial changes of the user 120 may also be detected in other manners. As an example, the predetermined change pattern may be that the face of the user 120 moves from a third position to a fourth position. The third position is a position of a side of the face facing towards the image capturing apparatus. The third position is substantially identical to the first position 510 and may have an angular difference ranging from 0 to 30°. The fourth position is a position of a front of the face facing towards the image capturing apparatus. The fourth potion is substantially identical to the second position 520 and may have an angular difference of 0 to 30°. In this way, the situation that the posterior brain being oriented towards the image capturing apparatus is sensed as the face facing towards the image capturing apparatus may be avoided, such that it is possible to more precisely sense a start action (i.e., a wake-up action) of the user 120 turning the face to the electronic device 110 so as to perform the interaction.

Figure 6:
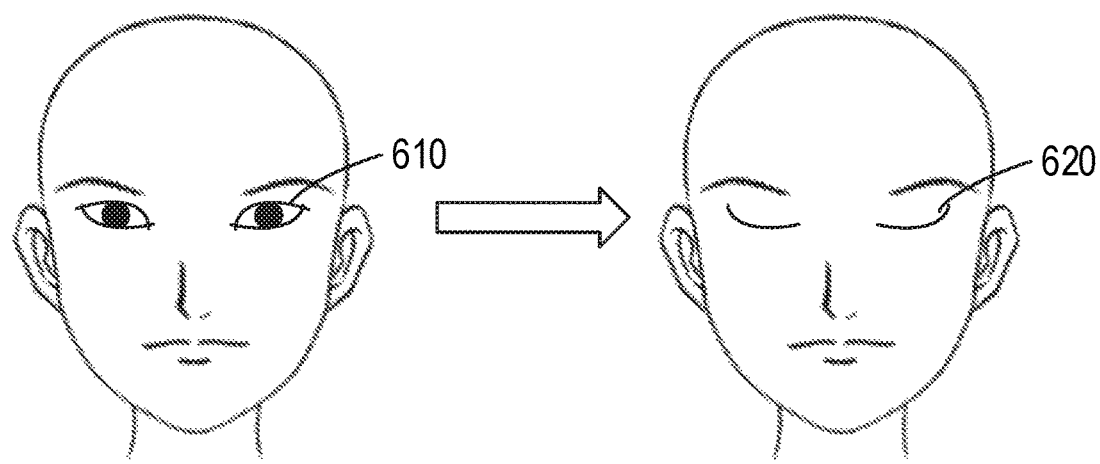
FIG. 6 illustrates a schematic diagram of a change in an eye state when determining whether a change in a head feature matches a predetermined change pattern according to some embodiments of the present disclosure.

FIG. 6 illustrates a schematic diagram of a change in an eye state when determining whether a change in a head feature matches a predetermined change pattern according to some embodiments of the present disclosure. As shown in FIG. 6, the predetermined change pattern may be that the eye of the user 120 is changed from an open state 610 to a closed state 620. That is, when it is determined that the eye of the user 120 is changed from the open state 610 to the closed state 620, it is determined that the change in the head feature matches the predetermined change pattern. As an example, when the image capturing apparatus of the electronic device 110 detects a blinking action of the user 120, it is determined that the user 120 issues (provides or gives) a wake-up command to the electronic device 110. Alternatively or additionally, when the image capturing apparatus of the electronic device 110 detects that one eye of the user 120 has completed the blinking action while the other eye remains substantially unchanged, the user 120 is determined to issue a wake-up command to the electronic device 110. Alternatively or additionally, when the image capturing apparatus of the electronic device 110 detects a blinking action of the user 120 a predetermined number of times (e.g., twice), it is determined that the user 120 gives a wake-up instruction to the electronic device 110. Alternatively or additionally, when the image capturing apparatus of the electronic device 110 detects an eye closing action of the user 120 for a predetermined length of time (i.e., the user closes his/her eye for a predetermined length of time), it is determined that the user 120 issues a wake-up instruction to the electronic device 110. In this way, a particular blink action may be utilized to wake up the electronic device 110. Compared with the traditional speech wake-up manner, the blinking wake-up manner is more convenient and more universal.

Figure 7:
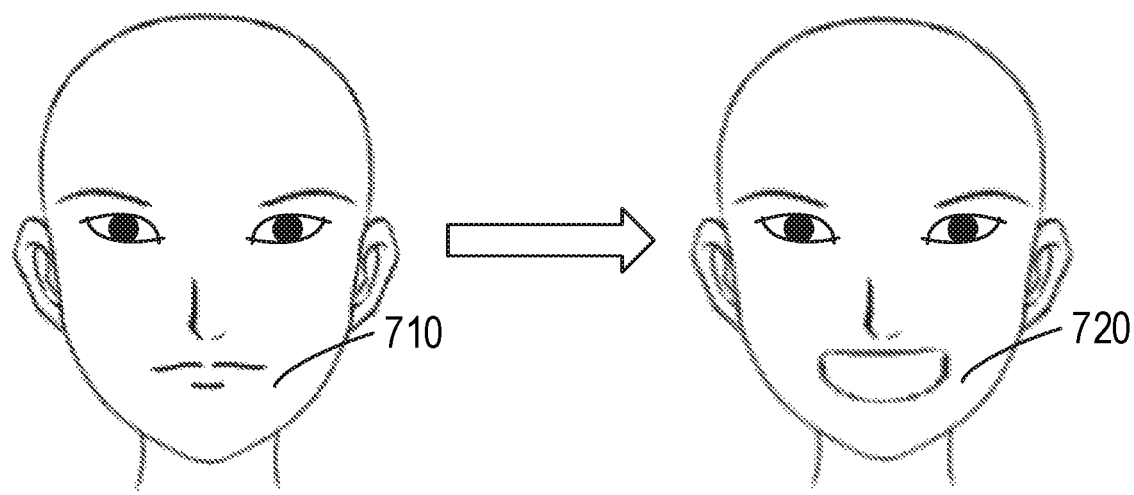
FIG. 7 illustrates a schematic diagram of a change in a mouth state when determining whether a change in a head feature matches a predetermined change pattern according to some embodiments of the present disclosure.

FIG. 7 illustrates a schematic diagram of a change in a mouth state when determining whether a change in a head feature matches a predetermined change pattern according to some embodiments of the present disclosure. As shown in FIG. 7, the predetermined change pattern may be that the mouth is changed from a closed state 710 to an open state 720 for a predetermined length of time. That is, when it is determined that the mouth of the user 120 is changed from the closed state 710 to the open state 720 for the predetermined length of time, it is determined that the change in the head feature matches the predetermined change pattern. In this way, a particular mouth opening action may be utilized to wake up the electronic device 110. Compared with the traditional speech wake-up manner, the mouth opening wake-up manner is more convenient and more universal.

Figure 8:
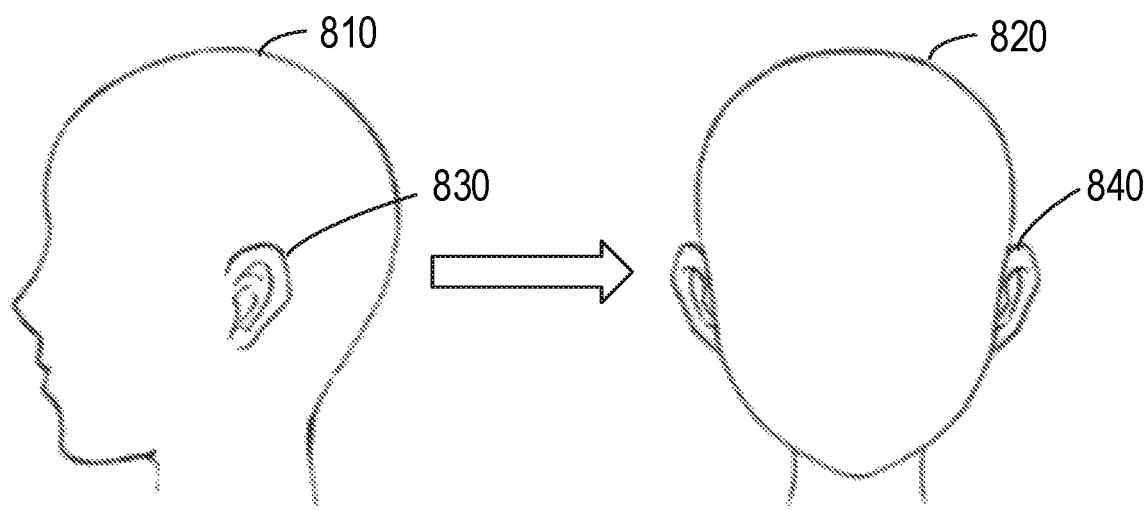
FIG. 8 illustrates a schematic diagram of a change in an ear profile when determining whether a change in a head feature matches a predetermined change pattern according to some embodiments of the present disclosure.

FIG. 8 illustrates a schematic diagram of a change in an ear profile when determining whether a change in a head feature matches a predetermined change pattern according to some embodiments of the present disclosure. As shown in FIG. 8, the predetermined change pattern may be that the ear of the user 120 is changed from a front profile 830 to a side profile 840. That is, the head swing motion of the user 120 is determined by detecting an orientation of the ear of the user 120. The determining manner here is similar to that of FIG. 4 of the head profile being changed from the side profile 410 to the front profile 420. That is, in the case of determining that the ear of the user 120 is changed from the front profile 830 to the side profile 840, it may be determined that the change in the head feature matches the predetermined change pattern. Alternatively or additionally, the head swing motion of the user 120 may also be determined by sensing a change in a projected position of the ear of the user 120 in the head profile of the user 120. This is because, when the side of the face of the user 120 faces the image capturing apparatus, the projected position of the ear profile 830 is located within the head profile 810 of the user 120. When the front side of the face of the user 120 faces the image capturing apparatus, the projected position of the ear profile 840 is located within the head profile 820. In fact, the wake-up manner based on the ear profile of the user 120 is an implementation based on the user 120's head swinging wake-up manner, and the wake-up manner based on the user's ear profile only requires to detect the ear profile of the user compared to other wake-up manners described above, so as to simplify the identifying and matching algorithm.

It should be understood that, in order to achieve a better technical effect, the manner of determining whether the change in the head feature matches the predetermined change pattern as shown in FIGS. 4-8 described above may also be performed in any combination.

Figure 9:
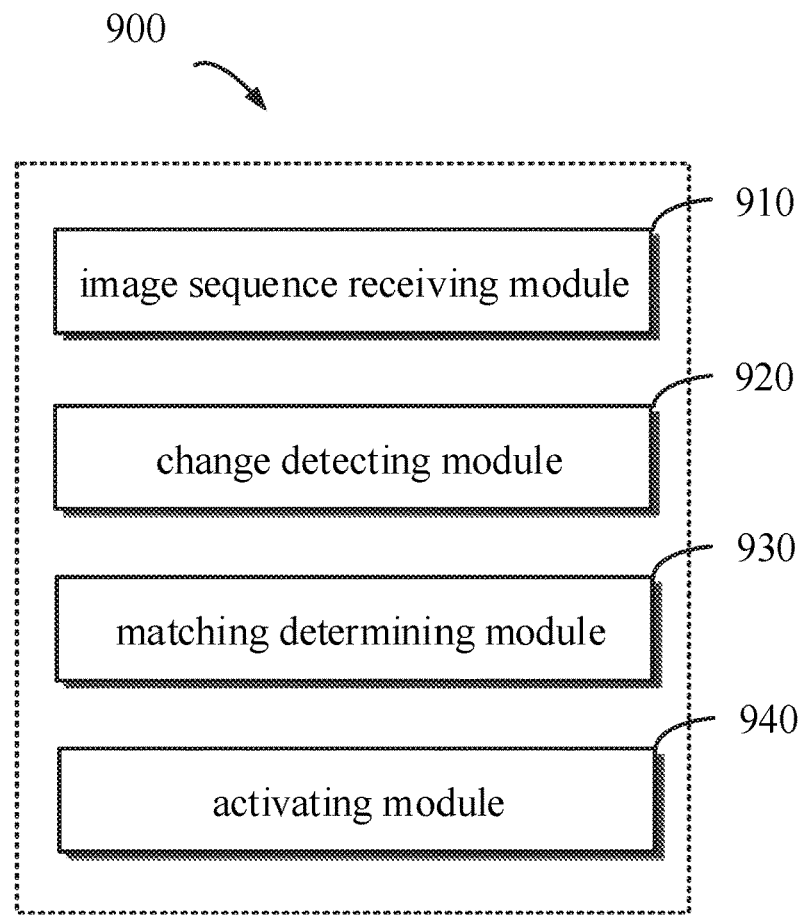
FIG. 9 illustrates a schematic block diagram of an apparatus executed at an electronic device, according to an embodiment of the present disclosure.

FIG. 9 illustrates a schematic block diagram of an apparatus 900 executed at an electronic device 110 according to an embodiment of the present disclosure. With reference to the description of FIGS. 4-8, the apparatus 900 shown in FIG. 9 includes an image sequence receiving module 910. The image sequence receiving module 910 is configured to receive an image sequence of a user 120 from an image capturing apparatus coupled to the electronic device 110. The apparatus 900 may also include a change detecting module 920. The change detecting module 920 is configured to detect a change in a head feature of the user 120 from the image sequence. The apparatus 900 may also include a matching determining module 930. The matching determining module 930 is configured to determine whether the change in the head feature matches a predetermined change pattern. The apparatus 900 may also include an activating module 940. The activating module 940 is configured to cause the electronic device 110 to enter an active state in response to determining that the change in the head feature matches the predetermined change pattern, the electronic device 110 in the active state being capable of responding to a speech command of the user 120.

In some embodiments, the image sequence receiving module 910 includes: a state determining sub-module (not shown), configured to determine whether the electronic device 110 is in an inactive state, the electronic device 110 in the inactive state being incapable of responding to the speech command of the user 120; and a receiving sub-module (not shown), configured to receive the image sequence in response to determining that the electronic device 110 is in the inactive state.

In some embodiments, the apparatus 900 may also include a deactivating module (not shown), configured to cause the electronic device 110 to enter an inactive state in response to the electronic device 110 being in the active state and not receiving the speech command from the user within a first threshold time interval, the electronic device 110 in the inactive state being incapable of responding to the speech command of the user 120.

In some embodiments, the change detecting module 920 includes a head feature identifying sub-module (not shown), configured to identify the head feature of the user 120 from an image in the image sequence; and a change detecting sub-module (not shown), configured to detect the change in the head feature from at least one image following the image in the image sequence in response to at least one head feature being identified from the image.

In some embodiments, the matching determining module 930 includes a first matching determining sub-module (not shown), configured to determine that the change in the head feature matches the predetermined change pattern in response to determining that a head profile of the user 120 is changed from a side profile 410 to a front profile 420.

In some embodiments, the matching determining module 930 includes a second matching determining sub-module (not shown), configured to determine that the change in the head feature matches the predetermined change pattern in response to determining that a face of the user 120 moves from a first position 510 to a second position 520, the first position 510 being a position of the face not facing the image capturing apparatus, and the second position 520 being a position of the face at least partially facing the image capturing apparatus.

In some embodiments, the matching determining module 930 includes a third matching determining sub-module (not shown), configured to determine that the change in the head feature matches the predetermined change pattern in response to determining that a face of the user 120 moves from a third position to a fourth position, the third position being a position of a side of the face facing the image capturing apparatus, and the fourth position being a position of a front of the face facing the image capturing apparatus.

In some embodiments, the matching determining module 930 includes a fourth matching determining sub-module (not shown), configured to determine that the change in the head feature matches the predetermined change pattern in response to determining that an eye of the user 120 is changed from an open state 610 to a closed state 620.

In some embodiments, the matching determining module 930 includes a fifth matching determining sub-module (not shown), configured to determine that the change in the head feature matches the predetermined change pattern in response to determining that a mouth of the user 120 is changed from a closed state 710 to an open state 720 for a second threshold time interval.

In some embodiments, the matching determining module 930 includes a sixth matching determining sub-module (not shown), configured to determine that the change in the head feature matches the predetermined change pattern in response to detecting that an ear of the user 120 is changed from a front profile 830 to a side profile 840.

It should be understood that in the actual application for determining whether the change in the head feature matches the predetermined change pattern, the first to sixth matching determining sub-modules may be executed individually or in any combination.

Figure 10:
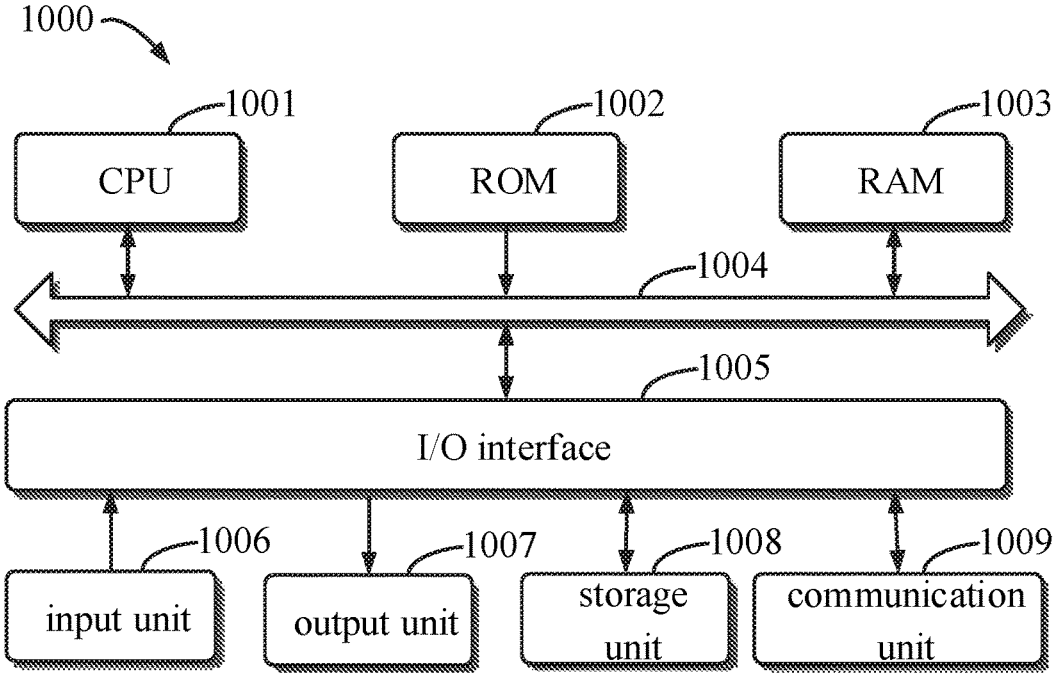
FIG. 10 illustrates a block diagram of a computing device capable of implementing embodiments of the present disclosure.

FIG. 10 illustrates a block diagram of a computing device 1000 capable of implementing embodiments of the present disclosure. As shown in the figure, the device 1000 includes a central processing unit (CPU) 1001 which may execute various actions and processes according to computer program instructions stored in a read only memory (ROM) 1002 or computer program instructions loaded from a storage unit 1008 to a random access memory (RAM) 1003. In the RAM 1003, various programs and data required for the operation of the device 1000 may also be stored. The CPU 1001, the ROM 1002, and the RAM 1003 are connected to each other via a bus 1004. An input/output (I/O) interface 1005 is also connected to the bus 1004.

A plurality of components in the device 1000 are connected to the I/O interface 1005, including: an input unit 1006, such as a keyboard, a mouse, etc.; an output unit 1007, such as various types of displays, speakers, etc.; a storage unit 1008, such as a disk, an optical disk etc.;

and a communication unit 1009, such as a network card, a modem, a wireless communication transceiver, etc. The communication unit 1009 allows the device 1000 to exchange information/data with other devices via a computer network such as the Internet and/or various telecommunication networks.

The processing unit 1001 performs various methods and processes described above, such as processes 200, 300, and/or 301. For example, in some embodiments, the processes 200, 300, and/or 301 may be implemented as a computer software program that is tangibly included in a machine readable medium, such as storage unit 1008. In some embodiments, some or all of the computer program may be loaded and/or installed on the device 1000 via the ROM 1002 and/or the communication unit 1009. One or more steps of processes 200, 300, and/or 301 described above may be performed when a computer program is loaded into the RAM 1003 and executed by the CPU 1001. Alternatively, in other embodiments, CPU 1001 may be configured to perform processes 200, 300, and/or 301 by any other suitable means (eg, by means of firmware).

The functions described above herein may be performed at least in part by one or more hardware logic components. For example, and without limitations, exemplary types of hardware logic components that may be used include: Field Programmable Gate Array (FPGA), Application Specific Integrated Circuit (ASIC), Application Specific Standard Product (ASSP), a system of System on Chip (SOC), Load Programmable Logic Device (CPLD) and the like.

Program codes for implementing the method of the present disclosure may be written in any combination of one or more programming languages. The program codes may be provided to a processor or controller of a general purpose computer, special purpose computer or other programmable data processing apparatus, such that the program code, when executed by the processor or controller, enables the functions/operations specified in the flowcharts and/or block diagrams being implemented. The program codes may be entirely or partly executed on a machine, partly executed as an independent software package on the machine, and partly executed on a remote machine or entirely executed on the remote machine or a server.

In the context of the present disclosure, a machine readable medium may be a tangible medium that may contain or store a program for use by an instruction execution system, apparatus or device or a combination thereof. The machine readable medium may be a machine readable signal medium or a machine readable storage medium. A machine-readable medium may include, but is not limited to, an electronic, magnetic, optical, electromagnetic, infrared, or semiconductor system, apparatus, or device, or any suitable combination thereof. More specific examples of machine readable storage medium may include electrical connections based on one or more wires, a portable computer disk, a hard disk, a random access memory (RAM), a read only memory (ROM), an erasable programmable read only memory (EPROM or flash memory), optical fiber, a portable compact disk read only memory (CD-ROM), an optical storage device, a magnetic storage device, or any suitable combination thereof.

In addition, although the operations are depicted in a particular order, this should be understood to require such operations being performed in the illustrated particular order or in the order successively, or all illustrated operations being performed to achieve the desired results. Multitasking and parallel processing may be advantageous in certain circumstances. Likewise, although several specific implementation details are included in the above discussion, these should not be construed as limiting the scope of the disclosure. Certain features that are described in the context of separate embodiments may also be implemented in combination in a single implementation. Conversely, various features that are described in the context of a single implementation may be implemented in a plurality of implementations, either individually or in any suitable sub-combination.

Although the subject matter has been described in language specific to structural features and/or methodological acts, it should be understood that the subject matter defined in the appended claims is not necessarily limited to the specific features or acts described. Instead, the specific features and acts described above are merely exemplary forms of implementing the claims.

What is claimed is:

1. A speech interaction method, executed at an electronic device, comprising:
receiving an image sequence of a user from an image capturing apparatus coupled to the electronic device;
detecting a change in a head feature of the user from the image sequence, comprising: identifying the head feature of the user from a first image in the image sequence; and detecting the change in the head feature from at least one second image following the first image in the image sequence in response to at least one head feature being identified from the first image;
determining whether the change in the head feature matches a predetermined change pattern in response to determining that a face of the user moves from a position having a first angular with a side position of the face facing towards the image capturing apparatus to a position having a second angular with a front position of the face facing towards the image capturing apparatus, wherein the first angular and the second angular are set ranging from 0 to 30° to avoid a misdetection of a posterior brain of the user oriented towards the image capturing apparatus being sensed as the face facing towards the image capturing apparatus; and
causing the electronic device to enter an active state in response to determining that the change in the head feature matches the predetermined change pattern, the electronic device in the active state being capable of responding to a speech command of the user.

2. The method according to claim 1, receiving the image sequence comprising:
determining whether the electronic device is in an inactive state, the electronic device in the inactive state being incapable of responding to the speech command of the user; and
receiving the image sequence in response to determining that the electronic device is in the inactive state.

3. The method according to claim 1, further comprising:
causing the electronic device to enter an inactive state in response to the electronic device being in the active state and not receiving the speech command from the user within a first threshold time interval, the electronic device in the inactive state being incapable of responding to the speech command of the user.

4. The method according to claim 1, determining whether the change in the head feature matches the predetermined change pattern comprising:
determining that the change in the head feature matches the predetermined change pattern in response to determining that a head profile of the user is changed from a side profile to a front profile.

5. The method according to claim 1, determining whether the change in the head feature matches the predetermined change pattern comprising:
determining that the change in the head feature matches the predetermined change pattern in response to determining that a face of the user moves from a first position to a second position, the first position being a position of the face not facing towards the image capturing apparatus, and the second position being a position of the face at least partially facing towards the image capturing apparatus.

6. The method according to claim 1, determining whether the change in the head feature matches the predetermined change pattern comprising:
determining that the change in the head feature matches the predetermined change pattern in response to determining that an eye of the user is changed from an open state to a closed state.

7. The method according to claim 1, determining whether the change in the head feature matches the predetermined change pattern comprising:
determining that the change in the head feature matches the predetermined change pattern in response to determining that a mouth of the user is changed from a closed state to an open state for a second threshold time interval.

8. The method according to claim 1, determining whether the change in the head feature matches the predetermined change pattern comprising:
determining that the change in the head feature matches the predetermined change pattern in response to detecting that an ear of the user is changed from a front profile to a side profile.

9. The method according to claim 1, the electronic device being a speaker providing a speech interaction function.

10. An apparatus implemented at an electronic device, comprising:
one or more processors;
a memory storing instructions executable by the one or more processors;
wherein the one or more processors are configured to:
receive an image sequence of a user from an image capturing apparatus coupled to the electronic device;
detect a change in a head feature of the user from the image sequence by performing acts of: identifying the head feature of the user from a first image in the image sequence; and detecting the change in the head feature from at least one second image following the first image in the image sequence in response to at least one head feature being identified from the first image;
determine whether the change in the head feature matches a predetermined change pattern in response to determining that a face of the user moves from a position having a first angular with a side position of the face facing towards the image capturing apparatus to a position having a second angular with a front position of the face facing towards the image capturing apparatus, wherein the first angular and the second angular are set ranging from 0 to 30° to avoid a misdetection of a posterior brain of the user oriented towards the image capturing apparatus being sensed as the face facing towards the image capturing apparatus; and
cause the electronic device to enter an active state in response to determining that the change in the head feature matches the predetermined change pattern, the electronic device in the active state being capable of responding to a speech command of the user.

11. The apparatus according to claim 10, the one or more processors being configured to receive the image sequence by performing acts of:

determining whether the electronic device is in an inactive state, the electronic device in the inactive state being incapable of responding to the speech command of the user; and receiving the image sequence in response to determining that the electronic device is in the inactive state.

12. The apparatus according to claim 10, further comprising:

a deactivating module, configured to cause the electronic device to enter an inactive state in response to the electronic device being in the active state and not receiving the speech command from the user within a first threshold time interval, the electronic device in the inactive state being incapable of responding to the speech command of the user.

13. The apparatus according to claim 10, the one or more processors being configured to determine whether the change in the head feature matches the predetermined change pattern by performing an act of:

determining that the change in the head feature matches the predetermined change pattern in response to determining that a head profile of the user is changed from a side profile to a front profile.

14. The apparatus according to claim 10, the one or more processors being configured to determine whether the change in the head feature matches the predetermined change pattern by performing an act of:

determining that the change in the head feature matches the predetermined change pattern in response to determining that a face of the user moves from a first position to a second position, the first position being a position of the face not facing the image capturing apparatus, and the second position being a position of the face at least partially facing the image capturing apparatus.

15. The apparatus according to claim 10, the one or more processors being configured to determine whether the change in the head feature matches the predetermined change pattern by performing an act of:

determining that the change in the head feature matches the predetermined change pattern in response to determining that a face of the user moves from a third position to a fourth position, the third position being a position of a side of the face facing the image capturing apparatus, and the fourth position being a position of a front of the face facing the image capturing apparatus.

16. The apparatus according to claim 10, the one or more processors being configured to determine whether the change in the head feature matches the predetermined change pattern by performing an act of:

determining that the change in the head feature matches the predetermined change pattern in response to determining that an eye of the user is changed from an open state to a closed state.

17. A non-transitory computer-readable storage medium having a computer program stored thereon, the computer program being executed by a processor to implement a speech interaction method, the method comprising:

receiving an image sequence of a user from an image capturing apparatus coupled to the electronic device;

detecting a change in a head feature of the user from the image sequence, comprising: identifying the head feature of the user from a first image in the image sequence; and detecting the change in the head feature from at least one second image following the first image in the image sequence in response to at least one head feature being identified from the first image;

determining whether the change in the head feature matches a predetermined change pattern in response to determining that a face of the user moves from a position having a first angular with a side position of the face facing towards the image capturing apparatus to a position having a second angular with a front position of the face facing towards the image capturing apparatus, wherein the first angular and the second angular are set ranging from 0 to 30° to avoid a misdetection of a posterior brain of the user oriented towards the image capturing apparatus being sensed as the face facing towards the image capturing apparatus; and causing the electronic device to enter an active state in response to determining that the change in the head feature matches the predetermined change pattern, the electronic device in the active state being capable of responding to a speech command of the user.

* * * * *